United States Patent
Hecht

[19]

[11] Patent Number: 5,462,789
[45] Date of Patent: * Oct. 31, 1995

[54] SUBSTRATE

[75] Inventor: Hans Hecht, Korntal, Germany

[73] Assignee: Robert Bosch GmbH, Stuttgart, Germany

[ * ] Notice: The portion of the term of this patent subsequent to Oct. 26, 2010, has been disclaimed.

[21] Appl. No.: 64,532

[22] Filed: May 20, 1993

Related U.S. Application Data

[63] Continuation of Ser. No. 728,584, Jul. 11, 1991, Pat. No. 5,256,464.

[30] Foreign Application Priority Data

Aug. 18, 1990 [DE] Germany .............. 40 26 225.1

[51] Int. Cl.⁶ .................................................. B32B 9/00
[52] U.S. Cl. ..................... 428/209; 428/141; 428/156; 428/304.4; 428/601; 428/604
[58] Field of Search ....................... 428/209, 141, 428/156, 601, 604, 304.4

[56] References Cited

U.S. PATENT DOCUMENTS

| 4,196,622 | 4/1980 | Peter | 73/204 |
| 4,783,358 | 11/1988 | Ikeda et al. | 428/138 |
| 4,936,145 | 6/1990 | Hohenstatt | 73/204 |

FOREIGN PATENT DOCUMENTS

| 3823642 | 3/1989 | Germany | G01P 5/12 |
| 2094983 | 9/1982 | United Kingdom . | |

Primary Examiner—Patrick J. Ryan
Assistant Examiner—Kam F. Lee
Attorney, Agent, or Firm—Kenyon & Kenyon

[57] ABSTRACT

A substrate for electronic components has a layer of material covering at least a portion of the substrate. Recesses are formed in a layer of material and located in a pattern relative to each other to form a predetermined temperature distribution across the layer of material. The layer of material can be formed as a resistive film for a heating resistor element. The shape, size and pattern of the recesses are selected to balance the thermal stress across the surface of the layer of material.

16 Claims, 3 Drawing Sheets

SUBSTRATE

This application is a continuation of application Ser. No. 07/728,584, filed Jul. 11, 1991, now U.S. Pat. No. 5,286,464.

FIELD OF THE INVENTION

The present invention relates to substrates having at least one layer of material attached to the substrate with recesses formed in the layer of material and, more particularly, to such substrates for use in electronic circuitry and methods of making such substrates.

BACKGROUND OF THE INVENTION

Substrates of this kind have been disclosed, for example, in German Patent No. DE-38 23 642 C2. In such substrates, recesses in the form of L-shaped or meander-shaped cuts are introduced in a layer arranged on the substrate surface in order to influence the properties of the layer, for example, the resistance of the layer when the layer is a resistive film. The disadvantage of these known substrates is that the heat output densities vary as a result of the special shape of the recesses, particularly when the layer configured on the substrate is a heatable resistive film. This variation is not desirable. An analogous situation occurs when the substrate forms a resistor, and the resistor is used to measure temperature and there is a temperature distribution that varies locally. The local current density generated as a result of the distribution of the recesses causes a local variation in the weighting of the temperature field, which is generally undesirable. This is particularly disadvantageous when this type of stratified structure is a component of a precision measuring device, such as an air-mass flow meter for an internal combustion engine.

SUMMARY OF THE INVENTION

The present invention is directed to a substrate for electronic components comprising a layer of material covering at least one part of at least one surface of the substrate. A plurality of recesses are formed in the layer of material and located in a pattern relative to each other to develop a predetermined temperature distribution across a surface of the layer.

In contrast to known substrates, the substrate according to the present invention offers numerous advantages. As a result of the plurality of recesses, which have essentially the same or comparable cross-sectional areas, and are distributed over the surface of the layer so that they are separated from each other locally, the ratio between the cross-sectional area of the recesses and the cross-sectional area of the surface of the layer can be adjusted precisely for each surface element. When the recesses are distributed evenly over the surface of the layer, a constant surface relation is easily feasible. On the other hand, one can easily adjust to a different surface relation by changing the number of recesses, or by altering the cross-section of the recesses from one surface element of the layer to another.

A particularly fine adjustment of the surface relation between the cross-sectional area of the recesses and the surface of the layer is obtained, for example, by first introducing recesses with a first comparatively large cross-sectional area in the layer configured on the substrate, and by evenly distributing them over the surface of the substrate. Additionally, one can introduce other recesses having a different, for example smaller cross-sectional area, and distribute them evenly and/or with a locally variable density.

This is particularly advantageous in applications where the substrate is an insulating body, and the layer configured on the substrate is developed as a resistive film, particularly as a heatable resistive film. By properly proportioning the surface relation clarified above between the cross-sectional area of the recesses and the surface of the layer per surface element of the layer, the resistance of the layer can be adapted quite easily to a suitable local current density. The result is an exceptionally even distribution of the heating power for numerous applications. For other applications it is feasible for the heat output distribution to correspond to a specified function that varies locally. Both are particularly effective when the stratified structure developed according to the present invention is applied as a resistor in a resistance bridge circuit, particularly when this resistance bridge is used as a measuring agent in an air-mass flow meter of an internal combustion engine.

The substrate developed according to the present invention can be manufactured quite easily and economically in the case of a stratified structure covered with a preferably homogeneous layer, by removing the layer only selectively at predetermined locations to form the recesses. An energy beam that can be focused on a surface of the layer is particularly suited for this task. Preferably, a laser beam is used. Using generally known deflecting means, the laser beam is focused on the layer to remove the material of the layer at the desired locations to form the recesses.

U.S. Pat. No. 4,196,622, which issued to the applicant of the present application, discloses a measuring device, in particular an air-mass flow meter for an internal combustion engine. As will be recognized by those skilled in the art, the substrate according to the present invention could be applied quite advantageously for this device.

Exemplified embodiments of the present invention are depicted in the accompanying drawings and clarified in greater detail in the following detailed description.

DETAILED DESCRIPTION

Figure 1:
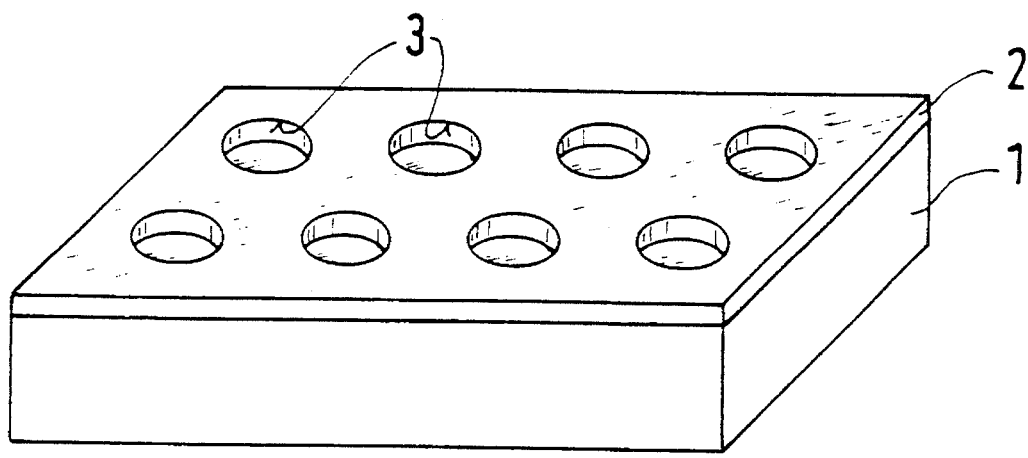
FIG. 1 shows a first exemplified embodiment of a substrate embodying the present invention including a plurality of recesses, each having the same cross-sectional area.

In FIG. 1, a substrate 1 embodying the present invention is bounded by several surfaces defining a suitable shape, which in the embodiment of the present invention illustrated is rectangular. On at least one part of at least one of its surfaces, the substrate 1 includes a layer 2, and recesses 3 formed within the layer 2. In the simplest case, the recesses 3 completely perforate the layer 2, so that the surface of the substrate 1 comes to light in the area of the recesses 3. As shown in FIG. 1, the recesses 3 essentially have a conforming cross-sectional area and are evenly distributed over the surface of the layer 2. In this manner, a basically constant and, therefore, a particularly location-independent relation results between the cross-sectional area of the recesses and the surface of the layer 2 for each surface element of the layer 2.

Figure 2:
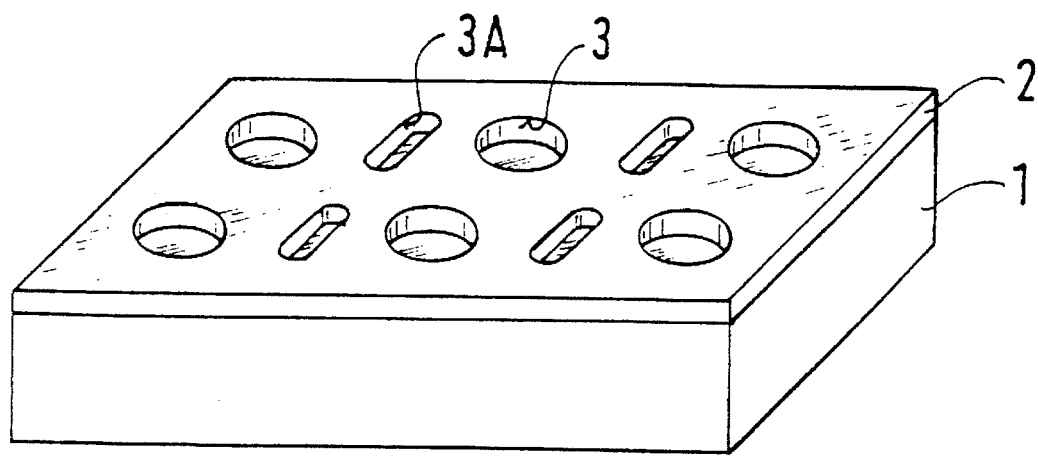
FIG. 2 depicts another substrate embodying the present invention including recesses of differing cross-sectional areas distributed evenly over the layer.

The substrate depicted in FIG. 2 differs from the exemplified embodiment depicted in FIG. 1, in that in addition to the recesses 3 of a first cross-sectional area which are already visible in FIG. 1, recesses 3A of a second cross-sectional area are also introduced in the layer 2. As shown in FIG. 2, the recesses 3A, in particular, have a smaller cross-sectional area than the recesses 3.

Figure 3:
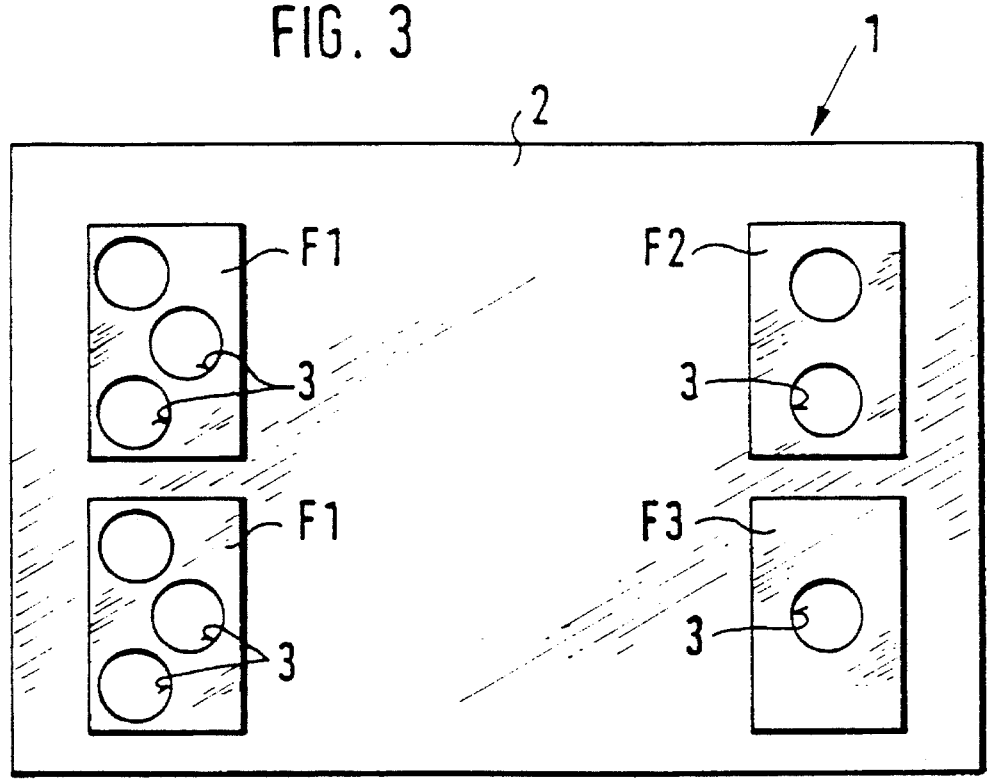
FIG. 3 shows another substrate embodying the present invention with varying surface relations between the cross-sectional areas of the recesses and the surface of the layer for each surface element.

The exemplified embodiment according to FIG. 3, which represents a top view of a surface 2 of a substrate 1, clarifies further possible refinements of the present invention. On the one hand, it is possible to have a constant surface relation between the cross-sectional area of the recesses 3 and the surface of the layer 2, as depicted, for example in the surface elements F1 of the layer 2. On the other hand, it is also possible to have a surface relation which varies from location to location between the cross-sectional area of the recesses 3 and the surface of the layer 2, as is discernible upon viewing the surface elements F2 and F3 of FIG. 3. For example, the surface area of the recesses 3 in the surface element F2 is twice as large as in the surface element F3, while the surface area of the recesses 3 in the surface elements F1 is three times as large as in the surface element F3.

Figure 4:
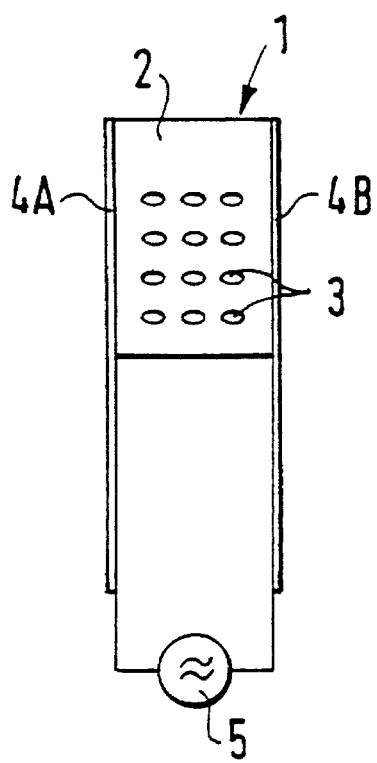
FIG. 4 illustrates another substrate embodying the present invention, developed as a heating resistor element coupled to a current source.

FIG. 4 shows a refinement of a substrate 1 of the present invention designed as a heating resistor element. The substrate 1 thus includes a layer 2 developed as a resistive film on which electrically conductive contacts 4A, 4B are configured, preferably on two mutually opposing sides of the layer 2. The contacts 4A, 4B are in turn connected to a current source 5, so that the layer developed as a resistive film is heatable by means of current flow. The ohmic resistance of the layer 2 can be simply and precisely adjusted to a specifiable set point value by means of the recesses 3 introduced in the layer 2. In a particularly advantageous way, one can thereby guarantee an exceptionally uniform distribution of the heat output by effectively applying recesses 3 of differing cross-sectional areas and by properly distributing the recesses 3 over the surface of the layer 2. This is particularly advantageous when this type of heating resistor element is employed in a precision measuring instrument, in particular, as a bridge resistor of a resistance measuring bridge for an air-mass flow meter of an internal combustion engine.

Figure 5:
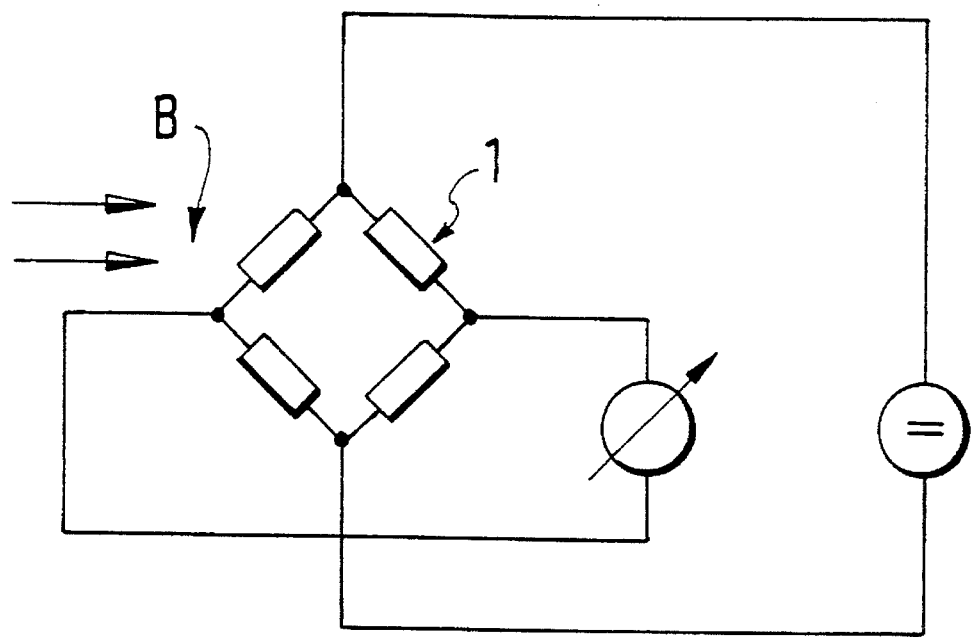
FIG. 5 shows the substrate of FIG. 4 coupled within a measuring bridge.

In FIG. 5 such an application of the substrate 1 is illustrated schematically, for instance, in an air-mass flow meter as shown and described in U.S. Pat. No. 4,196,622, which is hereby expressly incorporated by reference as part of the present disclosure. The substrate 1 is thus formed as a component of a resistance measuring bridge B, which is wired to a current supply circuit and an indicating circuit and is exposed to an air flow, as indicated by the arrows in FIG. 5.

Figure 6:
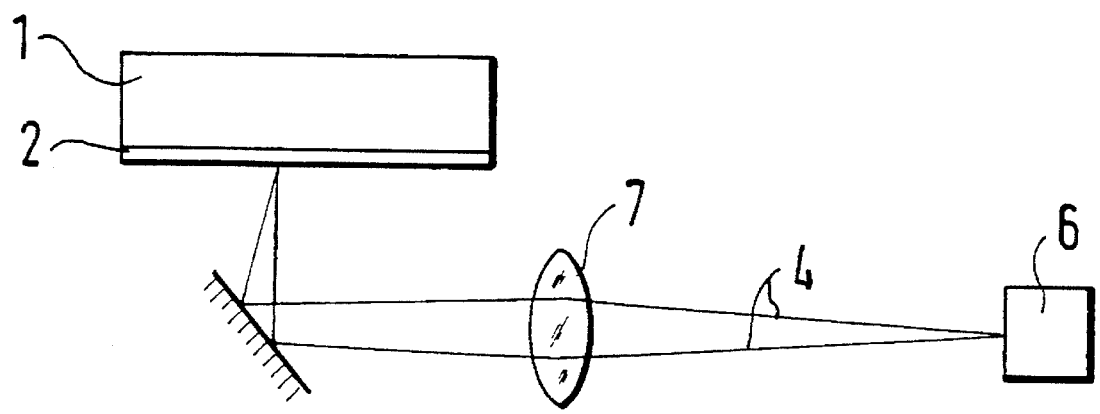
FIG. 6 shows an apparatus for producing recesses in a layer arranged on a substrate in accordance with the method of the present invention.

The substrate according to the present invention is advantageously manufactured in the case of a substrate 1 covered with a preferably homogenous layer 2, as depicted in FIG. 6, by selectively focusing an energy beam, preferably a laser beam 4, on the layer 2 to form recesses by removing the layer material in selected locations.

For this purpose, the beam 4 generated by a radiation source 6 is deflected over the layer 2 via focusing means, for example, a convergent lens 7, as well as suitable deflecting means, for example, a galvanometer mirror 8, and is in turn focused on a portion of the layer 2. The radiation source is preferably operated in a pulsed mode so that the material is only removed at certain points from the layer 2 to form the recesses 3.

I claim:

1. An electronic device comprising:

a base layer made of an insulating material; and a resistance layer having a first surface adjacent to at least a portion of the base layer, a second surface opposite to the first surface, and a plurality of side surfaces, the second surface having a plurality of recesses disposed therein, each of the plurality of recesses being spaced from each of the plurality of side surfaces.

2. The electronic device according to claim 1, wherein the plurality of recesses are distributed along the second surface so as to create a preselected heat distribution along the resistance layer.

3. The electronic device according to claim 1, wherein the second surface of the resistance layer is divided into at least first and second portions, the first portion containing at least a first recess of the plurality of recesses and the second portion containing at least a second recess of the plurality of recesses.

4. The electronic device according to claim 3, wherein a cross-sectional area of the first recess is equal to a cross-sectional area of the second recess.

5. The electronic device according to claim 3, wherein a cross-sectional area of the first recess is different than a cross-sectional area of the second recess.

6. The electronic device according to claim 3, wherein the first portion contains a first set of recesses of the plurality of recesses and the second portion contains a second set of recesses of the plurality of recesses.

7. The electronic device according to claim 6, wherein a first cross-sectional area of each of the recesses in the first set of recesses is different than a second cross-sectional area of each of the recesses in the second set of recesses.

8. The electronic device according to claim 6, wherein a first total cross-sectional area of the recesses in the first set of recesses is equal to a second total cross-sectional area of the recesses in the second set of recesses.

9. The electronic device according to claim 6, wherein a first total cross-sectional area of the recesses in the first set of recesses is different than a second total cross-sectional area of the recesses in the second set of recesses.

10. The electronic device according to claim 9, wherein the first set contains a different number of recesses than the second set.

11. The electronic device according to claim 1, wherein the plurality of recesses have the same cross-sectional areas.

12. The electronic device according to claim 1, wherein a first recess of the plurality of recesses has a different cross-sectional area than a second recess of the plurality of recesses.

13. The electronic device according to claim 1, wherein the plurality of recesses are distributed uniformly across the second surface.

14. The electronic device according to claim 1, wherein the plurality of recesses are distributed nonuniformly across the second surface.

15. The electronic device according to claim 1, wherein the plurality of recesses are distinct from one another.

16. The electronic device according to claim 1, wherein the resistance layer is superimposed on the base layer.

* * * * *